United States Patent
Lin et al.

(10) Patent No.: US 9,055,222 B2
(45) Date of Patent: Jun. 9, 2015

(54) ELECTRONIC DEVICE AND METHOD FOR IMAGE STABILIZATION

(71) Applicant: HTC Corporation, Taoyuan, Taoyuan County (TW)

(72) Inventors: Ching-Fu Lin, Taoyuan (TW); Pol-Lin Tai, Taoyuan (TW); Cheng-Hsien Lin, Taoyuan (TW); Jing-Lung Wu, Taoyuan (TW); Hsin-Ti Chueh, Taoyuan (TW)

(73) Assignee: HTC CORPORATION, Taoyuan, Taoyuan County (TW)

( * ) Notice: Subject to any disclaimer, the term of this patent is extended or adjusted under 35 U.S.C. 154(b) by 133 days.

(21) Appl. No.: 13/735,299

(22) Filed: Jan. 7, 2013

(65) Prior Publication Data

US 2013/0222619 A1 Aug. 29, 2013

Related U.S. Application Data

(60) Provisional application No. 61/602,690, filed on Feb. 24, 2012.

(51) Int. Cl.
*H04N 5/228* (2006.01)
*H04N 5/232* (2006.01)

(52) U.S. Cl.
CPC .................. *H04N 5/23254* (2013.01)

(58) Field of Classification Search
USPC ............... 348/208.14, 207.99, 113, 208.99, 348/208.6, 208.4
See application file for complete search history.

(56) References Cited

U.S. PATENT DOCUMENTS 6,628,711 B1 * 9/2003 Mathew et al. .......... 375/240.12
7,876,359 B2 * 1/2011 von Flotow et al. ..... 348/208.14

* cited by examiner

*Primary Examiner* — Yogesh Aggarwal
(74) *Attorney, Agent, or Firm* — McClure, Qualey & Rodack, LLP

(57) ABSTRACT

An electronic device and methods for image stabilization for use in an electronic device are provided. The method includes the steps of: receiving a plurality of motion data, at least a portion of the plurality of motion data corresponding to a first image frame, determining a motion value corresponding to the first image frame according to the portion of motion data, determining a display offset between the first image frame to a reference image frame according to the motion value and providing a portion of the first image frame for display according to the display offset. The reference image frame is displayed prior to the first image frame and is stored in a storage unit.

20 Claims, 13 Drawing Sheets

ELECTRONIC DEVICE AND METHOD FOR IMAGE STABILIZATION

This application claims the benefit of U.S. Provisional Application Ser. No. 61/602,690 filed on Feb. 24, 2012.

CROSS-REFERENCES TO RELATED APPLICATIONS

Not applicable.

BACKGROUND OF THE INVENTION

1. Field of the Invention

The present invention relates to an electronic device and methods for image stabilization for use in an electronic device; more specifically, the present invention relates to an electronic device and methods for image stabilization that utilize a plurality of sensor data for determining motion related information and the consequent operations.

2. Descriptions of the Related Art

Image alignment is a technique used for geometrically matching two images according to their contents for certain purposes such as erasing hand shaking when taking multi-pictures. Image alignment can be applied to various multi-frame image processing domains such as high dynamic range preprocessing, video stabilization, multi-frames noise removal, multi-frames object removal, panorama stitching, etc.

For certain real-time applications like on-device video stabilization for video recording, computing performance becomes critical when aligning two neighboring frames. Hence, an efficient and accurate technique for image/video stabilization, especially for on-device stabilization, is in an urgent need.

SUMMARY OF THE INVENTION

An objective of this invention is to provide a method for image stabilization for use in an electronic device. The method comprises the following steps of: (a) capturing an image frame, (b) receiving a plurality of sensor data during a time interval comprising a time the image frame is captured, (c) determining a motion variance corresponding to the image frame according to the plurality of sensor data, and (d) determining whether to perform a stabilization on the image frame according to the motion variance. In response to the stabilization being determined, the method further comprises the following steps of: determining a motion offset of a saliency region of the image frame to a reference saliency region of a reference image frame, cropping a portion of the image frame according to the motion offset, and displaying the portion of the image frame on a display unit of the electronic device. It is noted that the reference image frame is captured prior to the image frame and is stored in a memory unit within the electronic device.

Another objective of this invention is to provide an electronic device. The electronic device comprises an image input unit, a sensor input unit, an image processing unit, and a display unit. The image processing unit comprises a motion analysis unit, a motion determination unit, and a stabilization unit. The image input unit is configured to capture an image frame. The sensor input unit is configured to receive a plurality of sensor data, wherein the plurality of sensor data is received by the sensor input unit during a time interval comprising a time the image frame is captured. The image processing unit is configured to process the image frame. The motion analysis unit is configured to determine a motion variance corresponding to the image frame according to the plurality of sensor data. The motion determination unit is configured to determine whether to perform a stabilization on the image frame according to the motion variance corresponding to the image frame. The stabilization unit is configured to determine a display offset of the image frame with respect to a reference image frame according to the stabilization determination. The display unit is configured to display a portion of the image frame according to the display offset.

A further objective of this invention is to provide a method for image stabilization for use in an electronic device. The method comprises the steps of: (a) receiving a plurality of motion data, at least a portion of the plurality of motion data corresponding to an image frame, (b) determining a motion degree corresponding to the image frame according to the portion of motion data, (c) determining a display offset between the image frame to a reference image frame according to the motion degree, and (d) providing a portion of the image frame for display according to the display offset. The reference image frame is displayed prior to the image frame and is stored in a storage unit.

The present invention determines motion information (e.g. the aforementioned motion variance, motion value, and/or motion degree) of an image frame according to sensor data that are received within a time interval comprising a time the image frame is captured, determines whether stabilization is required, and determines a display offset for the image frame. Various kinds of motion information are provided by the present invention so that whether the stabilization is required can be determined more accurately and efficiently. In addition, various kinds of techniques for performing motion estimation are provided by the present invention so that the display offset can be determined more accurately and efficiently. Hence, the effect of small disturbances caused due to undesired shaking (e.g. hand shaking) can be minimized The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

Figure 1A:
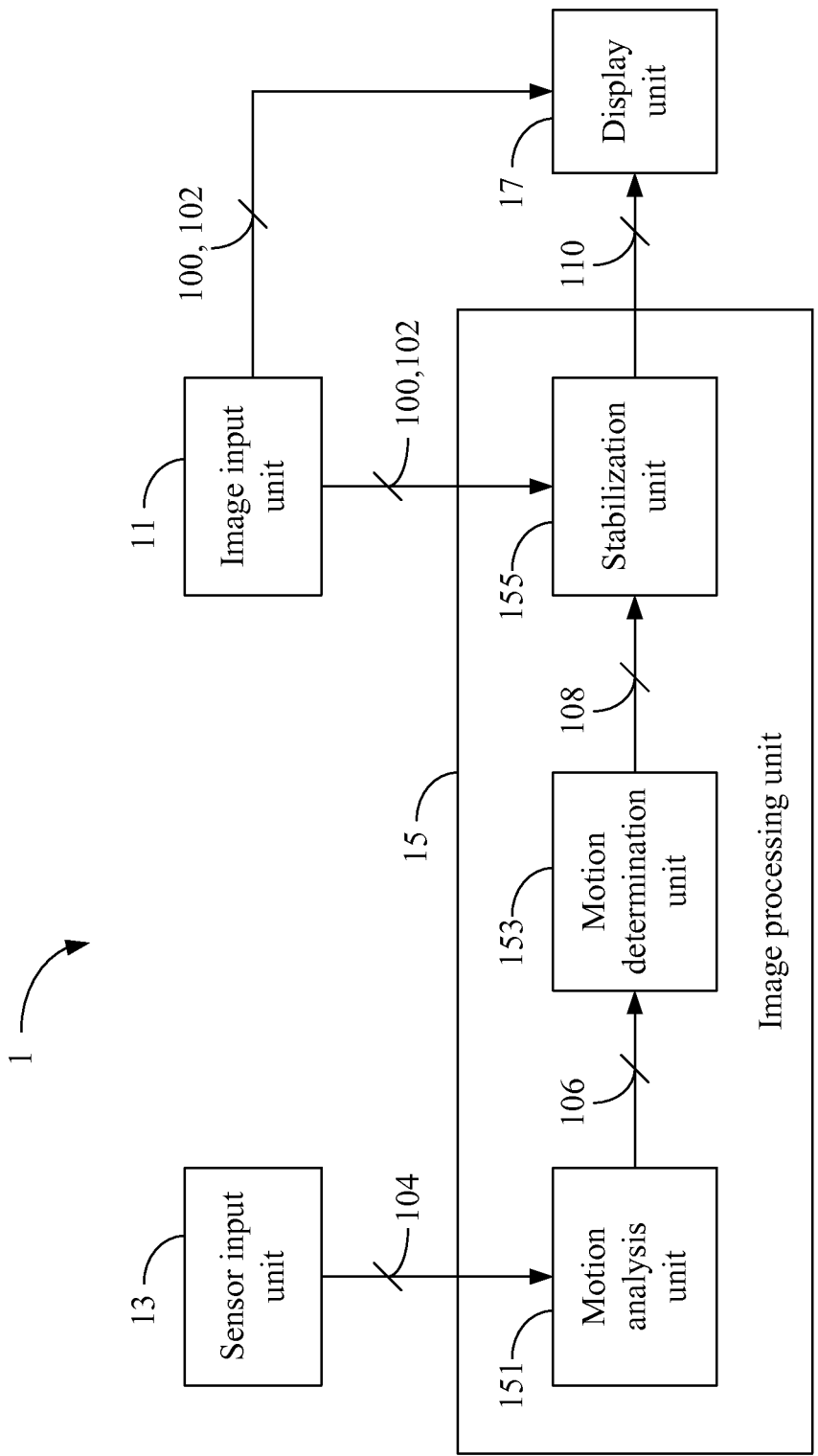
FIG. 1A illustrates an electronic device 1 of the first embodiment.

A first embodiment of the present invention is an electronic device 1 and a schematic view of which is depicted in FIG. 1A. The electronic device 1 comprises an image input unit 11, a sensor input unit 13, an image processing unit 15, and a display unit 17. The image processing unit 15 comprises a motion analysis unit 151, a motion determination unit 153, and a stabilization unit 155. The motion analysis unit 151 is electrically connected to the sensor input unit 13 and the motion determination unit 153. The stabilization unit 155 is electrically connected to the motion determination unit 153, the image input unit 11, and the display unit 17. The display unit 17 is further electrically connected to the image input unit 11.

The image input unit 11 may be a web camera or any other device that is able to capture or provide image frames. The sensor input unit 13 may be a G-sensor, an accelerometer, a gyro meter, or any other sensor that is able to generate a plurality of sensor data that is related to the movement of the electronic device 1. The image processing unit 15 may be any of various processors, central processing units (CPUs), microprocessors, or other computing devices that are well-known by those of ordinary skill in the art.

Since the present invention is related to image stabilization, the following descriptions will be focused on the process for image stabilization when the electronic device 1 is used for taking a video or a sequence of image frames.

Within a time interval, the image input unit 11 captures an image frame 102 and the sensor input unit 13 receives a plurality of sensor data 104. It is noted that the sensor data 104 may be provided at a constant rate. Preferably, the constant rate is higher than or equal to an image frame rate provided by the image input unit 11.

Afterwards, the image processing unit 15 processes the image frame 102 in terms of image stabilization. The motion analysis unit 151 determines a motion variance 106 corresponding to the image frame 102 according to the sensor data 104. Since both the image frame 102 and the sensor data 104 are derived within the same time interval, the motion variance 106 reflects the condition/degree of the movement of the electronic device 1 as well as the image frames (including the image frame 102) captured by the electronic device 1 within the time interval. Therefore, the motion determination unit 153 then determines whether to perform stabilization on the image frame 102 according to the motion variance 106 corresponding to the image frame 102.

Next, the stabilization unit 155 determines a display offset 110 of the image frame 102 with respect to another image frame 100 according to the determination result 108. It is noted that the image frame 100 is captured before the image frame 102 by the image input unit 11 and is treated as a reference image frame of the image frame 102. After the display offset 110 has been determined, the display unit 17 displays a portion 102d of the image frame 102 according to the display offset 110.

Figure 1B:
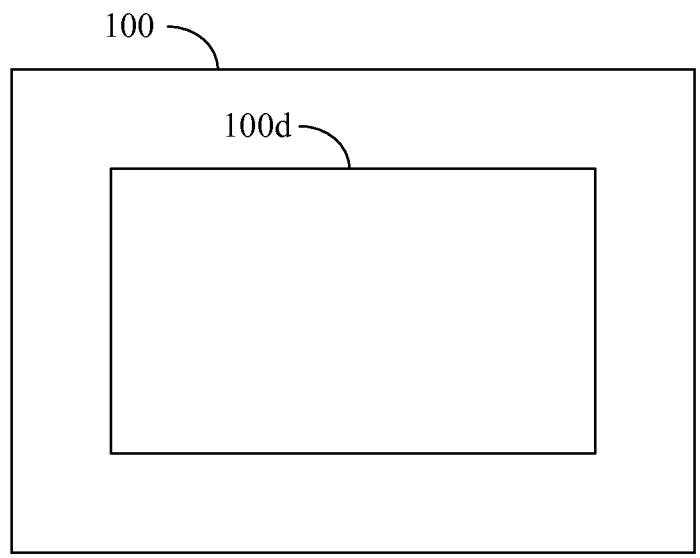
FIG. 1B illustrates a portion 100d of the image frame 100, the display offset 110, and the portion 102d of the image frame 102.
Figure 1B:
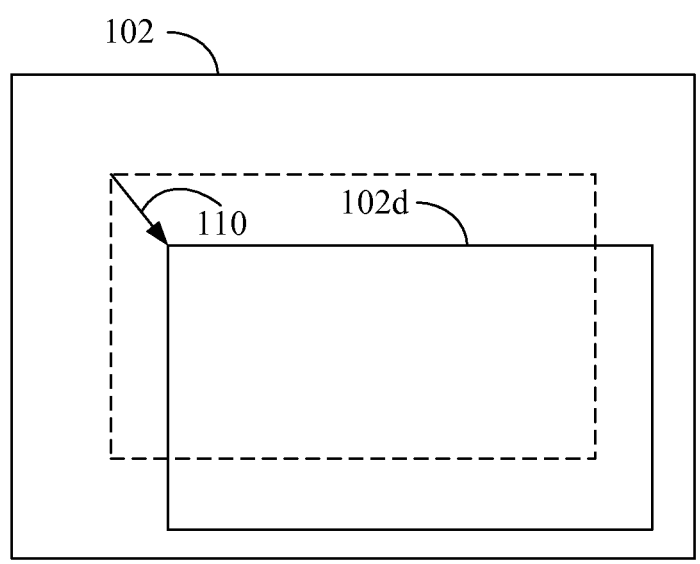

Please refer to FIG. 1B, which illustrated a portion 100d of the image frame 100, the display offset 110, and the portion 102d of the image frame 102. In this embodiment, the display unit 17 displays only the portion 100d of the image frame 100 and the portion 102d of the image frame 102. Since the position of the portion 102d to be displayed has been adjusted based on the display offset 110 and the portion surrounding the portion 102d will not be displayed, the image frames shown on the display unit 17 are stabilized to human eyes.

It is noted that, in other embodiments, the condition of the ambient light of the electronic device 1 can be used for determining whether the stabilization is required as well. Specifically, when the intensity of the image frame 102 is below a predetermined threshold (i.e. meaning that the ambient light is weak), the image processing unit 15 will skip the process of image stabilization due to the extraordinary amount of noises contained in the image frame 102. Yet in other embodiments, the condition of an auto-focus component can be used for determining whether the stabilization is required as well. Particularly, when the auto-focus component is functioning, the image processing unit 15 will skip the process of image stabilization to prevent from creating a skew image frame.

Moreover, in other embodiments, the electronic device 1 may comprise an additional pre-processing unit (not shown) electrically connected between the image input unit 11 and the stabilization unit 155. After the image input unit 11 captures the image frames 100, 102, the pre-processing unit may perform various processing (e.g. de-mosaic, de-noise, scaling, etc.) on the image frames 100, 102. Thereafter, the image processing unit 15 and the display unit 17 work on the pre-processed image frames (not shown) instead of the image frames 100, 102.

Figure 2:
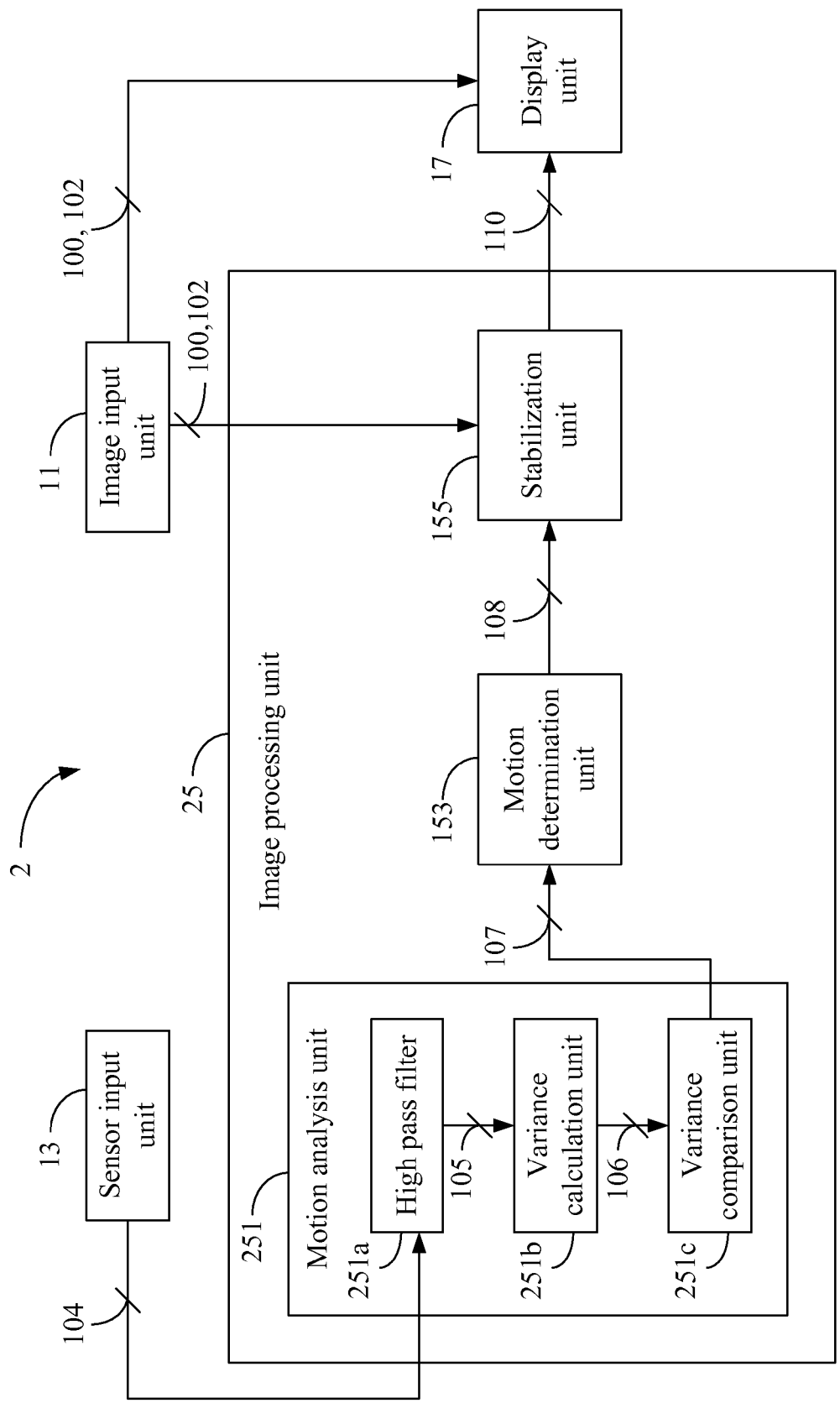
FIG. 2 illustrates an electronic device 2 of the second embodiment.

According to the above description, the electronic device 1 will determine a display offset for an image frame when the stabilization is determined required. Hence, the effect of small disturbances caused due to undesired shaking (e.g. hand shaking) can be minimized A second embodiment of the present invention is an electronic device 2 and a schematic view of which is depicted in FIG. 2. The electronic device 2 comprises an image input unit 11, a sensor input unit 13, an image processing unit 25, and a display unit 17. The image processing unit 25 comprises a motion analysis unit 251, a motion determination unit 153, and a stabilization unit 155. The motion analysis unit 251 comprises a high pass filter 251a, a variance calculation unit 251b, and a variance comparison unit 251c. The image input unit 11, the sensor input unit 13, the display unit 17, the motion determination unit 153, and the stabilization unit 155 comprised in the electronic device 2 perform similar operations as those comprised in the electronic device 1 of the first embodiment. Hence, the following descriptions will be focused on the operations performed by the motion analysis unit 251 of the electronic device 2.

In this embodiment, the high pass filter 251a is electrically connected to the sensor input unit 13 and the variance calculation unit 251b. Besides, the variance comparison unit 251c is electrically connected to the variance calculation unit 251b and the motion determination unit 153.

The high pass filter 251a receives the sensor data 104 and filters the sensor data 104 into the filtered sensor data 105. In this way, the filtered sensor data 105 contains only high frequency components of the sensor data 104; that is, the components that are related to the movement/shaking of the electronic device 2 within the time interval). The variance calculation unit 251b receives the filtered sensor data 105 from the high pass filter 251a and generates the motion variance 106 by performing an arithmetic operation on at least a portion of the filtered sensor data 105 and a plurality of weight values. The variance comparison unit 251c then determines a motion value 107 by comparing the motion variance 106 with a first threshold. Afterwards, the motion determination unit 153 determines whether to perform stabilization on the image frame 102 according to the motion value 107 (i.e. a value that is related to the motion variance 106).

An example for determining the motion variance 106 and the motion value 107 is given below, which, however, is not used to limit the scope of the present invention. In this example, the sensor data is g-sensor data and each set of the filtered sensor data 105 is represented as (x, y, z). It is noted that the variable x denotes x-axis gravity information, the variable y denotes y-axis gravity information, and the variable z denotes z-axis gravity information.

Next, the variance calculation unit 251b performs the following arithmetic operation to determine the motion variance 106. For each set of the filtered sensor data 105, the variance calculation unit 251b calculates a root-mean-square by the equation $w=\sqrt{x^2+y^2+z^2}$ and determines the motion variance 106 by the equation $w_f = \alpha w_t + (1-\alpha) \Sigma w(t-n)$. The variable $w_f$ denotes the motion variance 106 of the image frame 102, the variable $w_t$ denotes the root-mean-square of the latest set of the filtered sensor data 105, the variable $w_{t-n}$ denotes the sets of the filtered sensor data 105 except the latest set, the variable n is a positive integer and is the number of filtered sensor data, and the variable $\alpha$ is a value between 0 and 1.

From the aforementioned equation, it is understood that the number of the data sets of the filtered data 105 (i.e. variable n) used for calculating the root-mean-square and the consequent motion variance 106 is adjustable. Hence, the motion variance 106 of a current image frame (e.g. the image frame 102) depends on not only the latest status the sensor input unit 13 but also the previous status of the sensor input unit 13 over a period of time. That is, the motion variance 106 will be more accurate when more sets of the filtered sensor data 105 are included during the calculation.

Following that, the variance comparison unit 251c determines whether the electronic device 2 is in the condition of actual movement or in the condition of subtle movement caused by undesired handshaking. Particularly, the variance comparison unit 251c may determine the motion value 107 by comparing the motion variance 106 with the first threshold. The variance comparison unit 251c may set the value of the motion value 107 to the integer 1 to indicate the motion variance 106 is greater than the first threshold. On the contrary, the variance comparison unit 251c may set the value of the motion value 107 to the integer 0 to indicate the motion variance 106 is equal to or smaller than the first threshold. After the motion value 107 has been determined, the motion determination unit 153 can determine whether to perform stabilization on the image frame 102 according to the motion value 107.

In some other embodiments, the motion analysis unit 251 may omit the high pass filter 251a from the motion analysis unit 251. Under these circumstances, the variance calculation unit 251b determines the motion variance 106 based on the sensor data 104 instead.

According to the above description, the electronic device 2 performs an arithmetic operation for determining the motion variance 106. Since the filtered sensor data 105 used for determining the motion variance 106 covers a period of time, the motion variance 106 and the consequent motion value 107 become more accurate. As a result, whether to perform the stabilization on the image frame 102 can be determined in an accurate and efficient fashion.

Figure 3A:
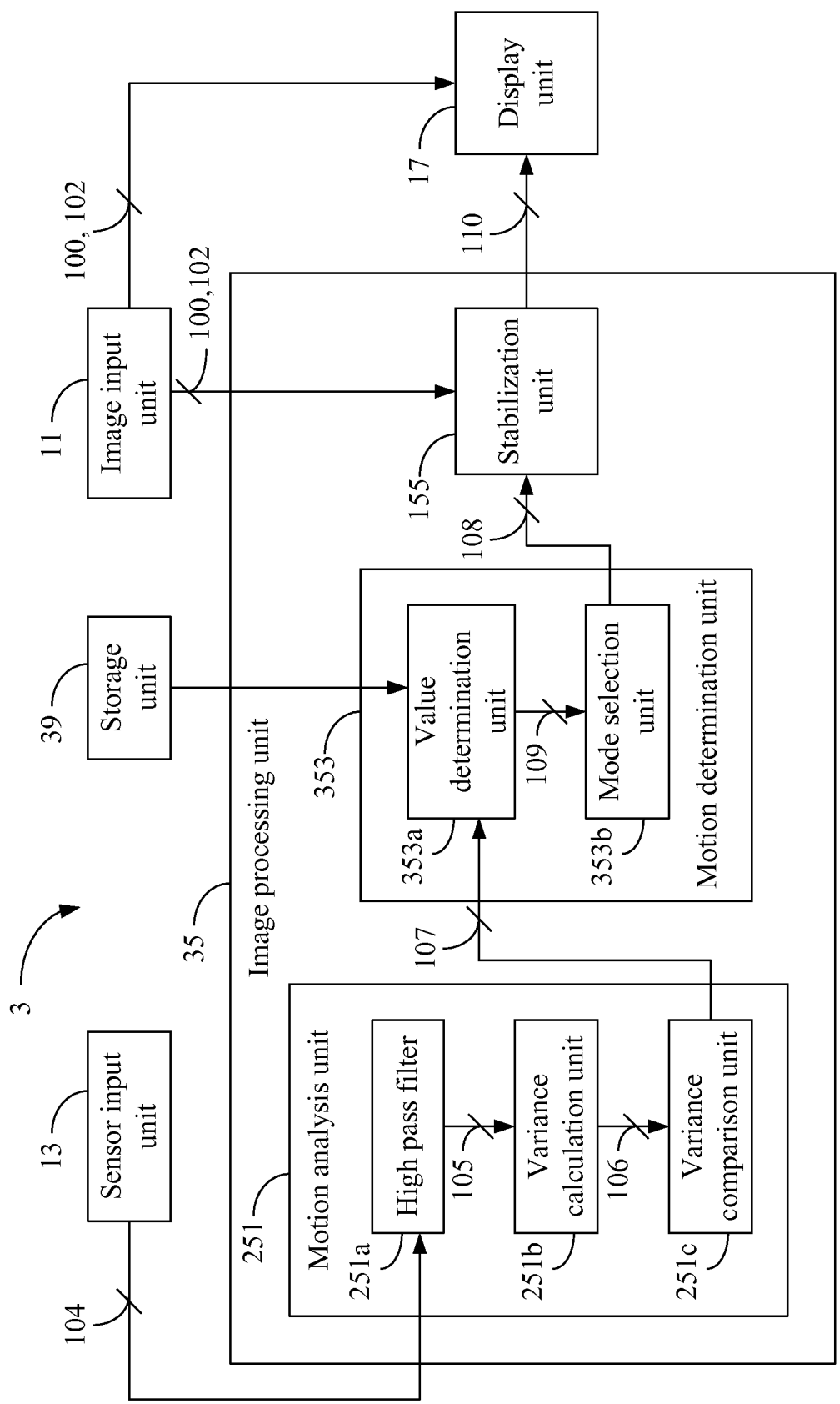
FIG. 3A illustrates an electronic device 3 of the third embodiment.

A third embodiment of the present invention is an electronic device 3 and a schematic view of which is depicted in FIG. 3A. The electronic device 3 comprises an image input unit 11, a sensor input unit 13, an image processing unit 35, a display unit 17, and a storage unit 39. The image processing unit 35 comprises a motion analysis unit 251, a motion determination unit 353, and a stabilization unit 155. The motion determination unit 353 comprises a value determination unit 353a and a mode selection unit 353b. The image input unit 11, the sensor input unit 13, the display unit 17, the motion analysis unit 251, and the stabilization unit 155 comprised in the electronic device 3 perform similar operations as those comprised in the electronic device 2 of the second embodiment. Hence, the following descriptions will be focused on the operations performed by the motion determination unit 353 and the storage unit 39 of the electronic device 3.

In this embodiment, the value determination unit 353a is electrically connected to the variance comparison unit 251c and the mode selection unit 353b. The mode selection unit 353b is electrically connected to the stabilization unit 155. The storage unit 39 is electrically connected to the value determination unit 353a.

Figure 3B:
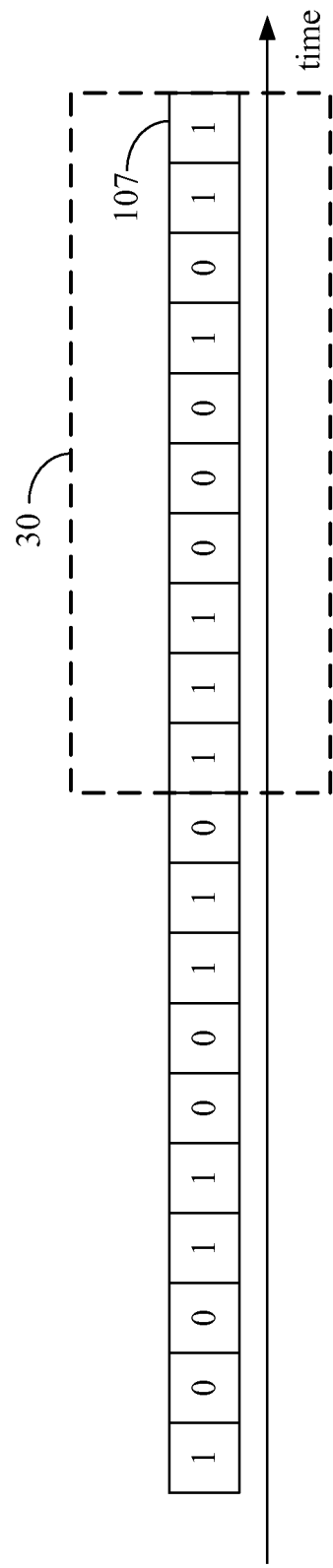
FIG. 3B illustrates the concept of determining the motion ratio 109.

After the variance comparison unit 251c generates the motion value 107, the value determination unit 353a determines a motion ratio 109 corresponding to the image frame 102. Please refer to FIG. 3B for the concept of determining the motion ratio 109, wherein the horizontal axis indicates the time. The integer shown in the most right-hand side is the motion value 107 corresponding to the image frame 102. The rest integers shown in FIG. 3B are the motion values corresponding to other image frames captured prior to the image frame 102. The motion values corresponding to other image frames are stored in the storage unit 39. Specifically, the value determination unit 353a determines the motion ratio 109 corresponding to the image frame 102 according to the motion value 107 corresponding to the image frame 102 and a plurality of motion values corresponding to other image frames captured prior to the image frame 102. For example, the value determination unit 353a can use a time window 30 of a predetermined size and select the motion values comprised in the time window 30 to determine the motion ratio 109. As shown in FIG. 3B, the predetermined size of the time window 30 is ten and six of the ten motion values comprised in the time window 30 are of value 1, so the value determination unit 353a determines that the motion ratio 109 is six-tenths.

Thereafter, the mode selection unit 353b compares the motion ratio 109 with a second threshold and determines whether to perform the stabilization according to the comparison result. As an example, the mode selection unit 353b may set the second threshold to the value three-tenth. Under this circumstance, when the motion ratio 109 is greater than the second threshold, the mode selection unit 353b determines that stabilization of the image frame 102 is required. On the contrary, when the motion ratio 109 is equal to or smaller than the second threshold, the mode selection unit 353b determines that stabilization of the image frame 102 is not required. The determination result 108 of the mode selection unit 353b will be transmitted to the stabilization unit 155 for determining the display offset 110.

In other embodiments, the motion analysis unit 251 can be replaced by the motion analysis unit 151 in the first embodiment. In this way, the value determination unit 353a will determine the motion ratio 109 based on the motion variances instead.

According to the above description, the electronic device 3 determines whether to perform the stabilization on the image frame 102 based on the motion ratio 109. Since the motion ratio 109 reflects the ratio of the motion of the electronic device 3, whether to perform the stabilization can be determined more accurately and efficiently.

Figure 4A:
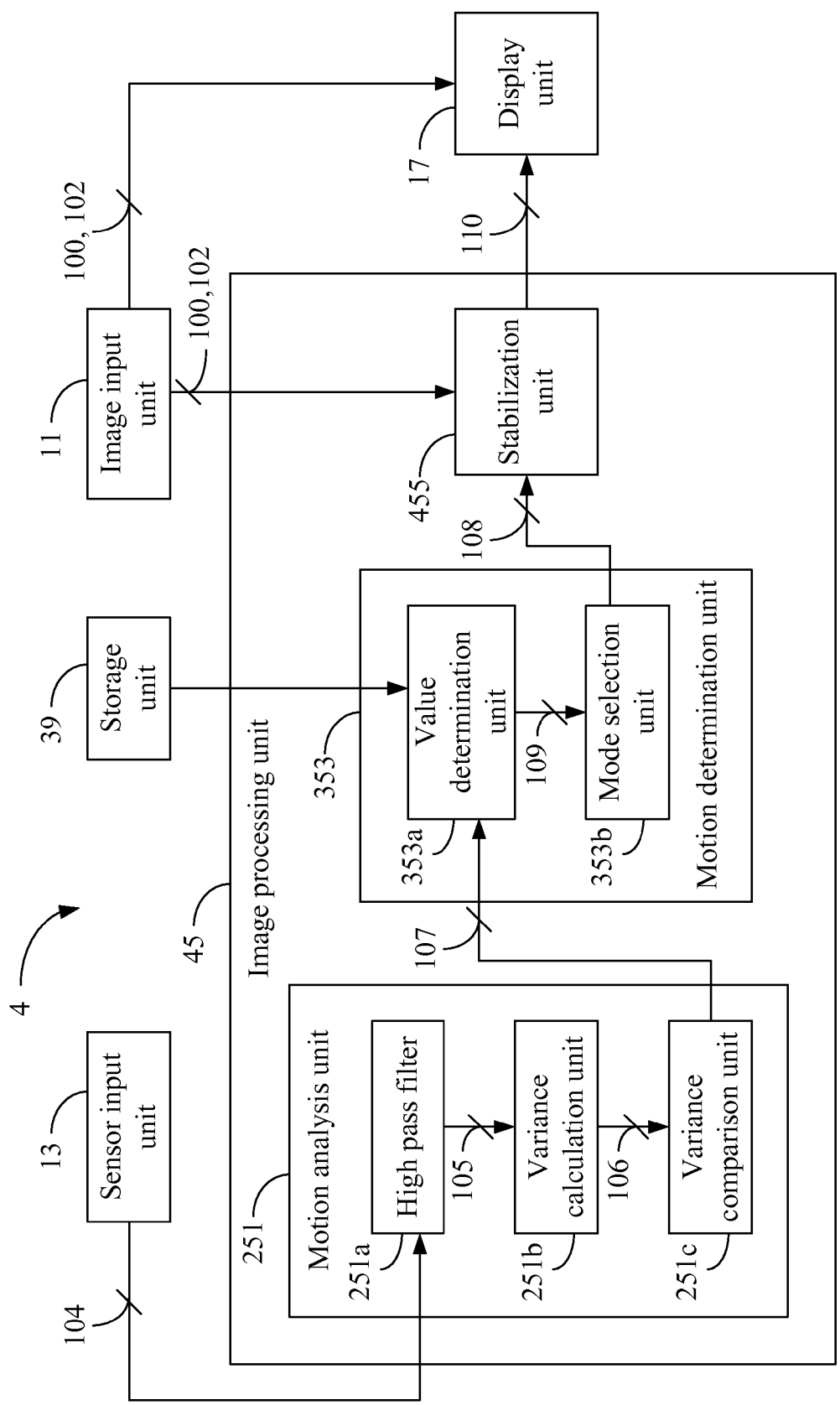
FIG. 4A illustrates an electronic device 4 of the fourth embodiment.

A fourth embodiment of the present invention is an electronic device 4 and a schematic view of which is depicted in FIG. 4A. The electronic device 4 comprises an image input unit 11, a sensor input unit 13, an image processing unit 45, a display unit 17, and a storage unit 39. The image processing unit 45 comprises a motion analysis unit 251, a motion determination unit 353, and a stabilization unit 455. As shown in FIG. 4B, the stabilization unit 455 comprises a down sample unit 455a, a feature extraction unit 455b, and a motion estimation unit 455c. It is noted that, in other embodiments, the motion analysis unit 251 may be replaced by the motion analysis unit 151 and the motion determination unit 353 may be replaced by the motion determination unit 153, which are readily appreciated by those of ordinary skill in the art.

The image input unit 11, the sensor input unit 13, the display unit 17, the storage unit 39, the motion analysis unit 251, and the motion determination unit 353 comprised in the electronic device 4 perform similar operations as those comprised in the electronic device 3 of the third embodiment. Hence, the following descriptions will be focused on the operations performed by the stabilization unit 455 of the electronic device 4.

In this embodiment and with reference to FIGS. 4A and 4B, the down sample unit 455a is electrically connected to the mode selection unit 353b, the feature extraction unit 455b, and the image input unit 11. The motion estimation unit 455c is electrically connected to the feature extraction unit 455b and the storage unit 39. The down sample unit 455a receives the determination result 108 from the mode selection unit 353b, which indicates whether the stabilization on the image frame 102 is required. The following description will be focused on the situation that the stabilization is required.

The down sample unit 455a obtains a down-sampled image frame 102a by down sampling the image frame 102 by a ratio. The purpose of down-sampling the image frame 102 is to reduce the computation complexity and load of the feature extraction unit 455b and the motion estimation unit 455c. Next, the feature extraction unit 455b obtains a saliency region 102b within the image frame 102, which may be achieved by performing a feature map searching on the down-sampled image frame 102a. During the process the feature map searching, the feature extraction unit 455b may perform various known processing on the down-sampled image 102a, such as blurring, normalization, equalization, etc.

It is worth to mention that the feature extraction unit 455b has obtained a saliency region 100b of the image frame 100 when processing the image frame 100 by the similar fashion. The saliency region 100b of the image frame 100 is stored in the storage unit 39. Since the image frame 100 is treated as a reference image frame, the saliency region 100b is treated as a reference saliency region. Afterwards, the motion estimation unit 455c determines an offset between the saliency region 102b and the saliency region 100b and then determines the display offset 110 according to the offset.

As an example, the size of the image frames 100, 102 may be M-by-N, the size of the down-sampled image frame 102a may be P-by-Q, and the size of the saliency regions 100b, 102b may be S-by-T. It is noted that $$r = \frac{P}{M} = \frac{Q}{N},$$

wherein the variable r indicates the ratio used by the down sample unit 455a. Furthermore, the size of the saliency regions 100b, 102b is smaller than the size of the down-sampled image frame 102a. Since the offset is determined based on the saliency regions 100b, 102b, the motion estimation unit 455c may scale the offset to the display offset 110 according to the size ratio between the image frame 102 and down-sampled image frame 102a.

Figure 4C:
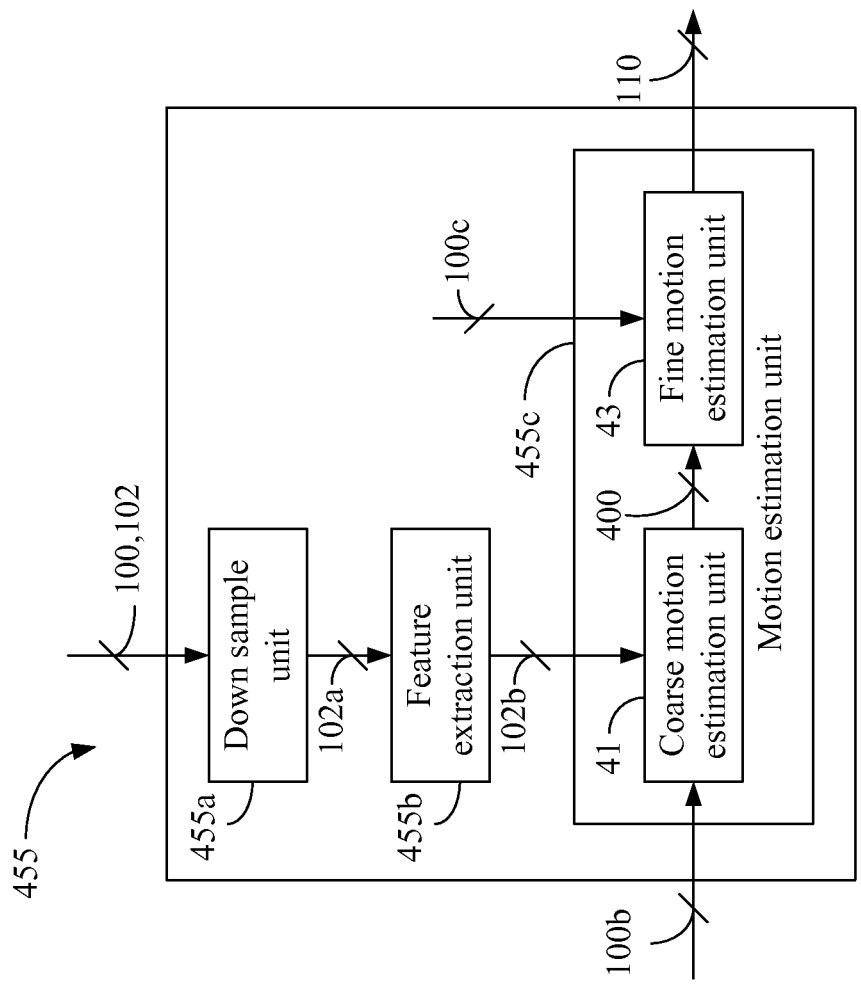
FIG. 4C illustrates an alternate embodiment of the stabilization unit 455.
Figure 4B:
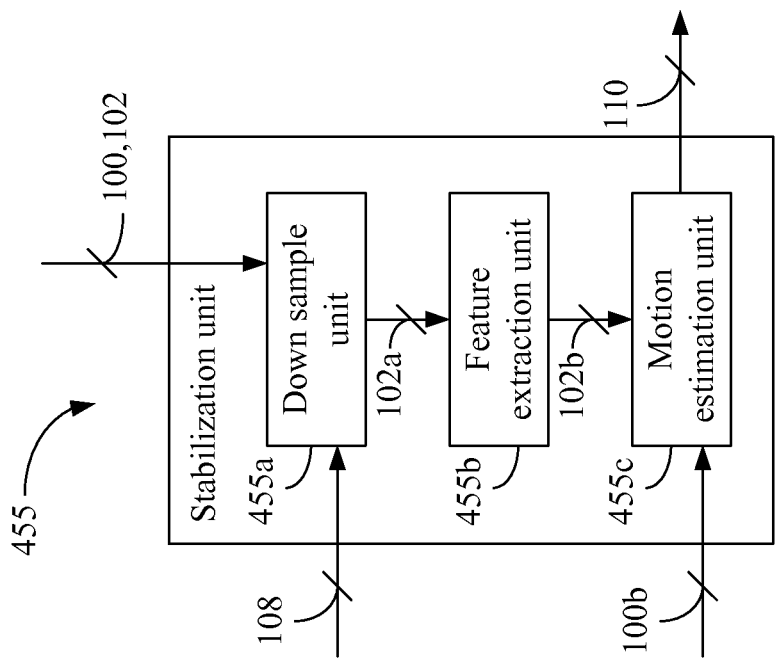
FIG. 4B illustrates the stabilization unit 455.

In some embodiments, the motion estimation unit 455c may further comprise a coarse motion estimation unit 41 and a fine motion estimation unit 43 as shown in FIG. 4C. The coarse motion estimation unit 41 determines a global offset 400 between the saliency regions 100b, 102b in a down-sampled resolution (i.e. P-by-Q). The fine motion estimation unit 43 then determines the display offset 110 between the saliency regions 100b, 102b in a full resolution (i.e. M-by-N) according to the global offset 400. Particularly, the fine motion estimation unit 43 may scale the global offset 400 by the ratio (i.e. r) used by the down sample unit 455a to locate the position of a fine reference saliency region in the image frame 102. The storage unit 39 stores a fine reference saliency region 100c of the image frame 100. The fine motion estimation unit 43 then determines the display offset 110 by comparing the fine reference saliency region of the image frame 102 and the fine reference saliency region 100c. To achieve better performance, the fine motion estimation unit 43 may divide the fine reference saliency region of the image frame 102 into two portions (such as the left portion and right portion) and determine which portion is closer to the fine reference saliency region 100c. Next, for the portion that is closer to the fine reference saliency region 100c, the fine motion estimation unit 43 may continue to divide it into two exclusive sub-portions, determine which sub-portion is closer to the fine reference saliency region 100c, and so on. By doing so, the display offset 110 can be efficiently determined According to the above description, the electronic device 4 determines the display offset 110 by determining the offset between two smaller-sized saliency regions 100b, 102b and scaling the offset into a proper size. If the stabilization has to be more accurate, the fine motion estimation unit 43 can be adopted to determine the display offset 110 by comparing two fine reference saliency regions. Hence, the display offset 110 can be performed in an efficient and accurate way.

A fifth embodiment of the present invention is a method for image stabilization for use in an electronic device such as the electronic devices 1-4. A flowchart of the method is illustrated in FIGS. 5A-5E.

First, step S51 is executed by the electronic device to capture an image frame. Next, step S52 is executed to receive a plurality of sensor data during a time interval comprising a time the image frame is captured. In other words, both the steps S51 and S52 are executed within the time interval. Step S53 is then executed by the electronic device to determine a motion variance corresponding to the image frame according to the plurality of sensor data.

Afterwards, step S54 is executed to determine whether to perform stabilization on the image frame according to the motion variance. If the step S54 determines that the stabilization is required, steps S55, S56, S57 are then executed. If the step S54 determines that the stabilization is not required, steps S58, S56, S57 are then executed.

When the stabilization is required, step S55 is executed to determine a motion offset of a saliency region of the image frame to a reference saliency region of a reference image frame. It is noted that the reference image frame is captured prior to the image frame and is stored in a memory unit within the electronic device. On the contrary, step S58 is executed to set the motion offset to 0 when the stabilization is not required. Following that, step S56 is executed for cropping a portion of the image frame according to the motion offset.

Finally, step S57 is executed to display the portion of the image frame on a display unit of the electronic device.

Figure 5A:
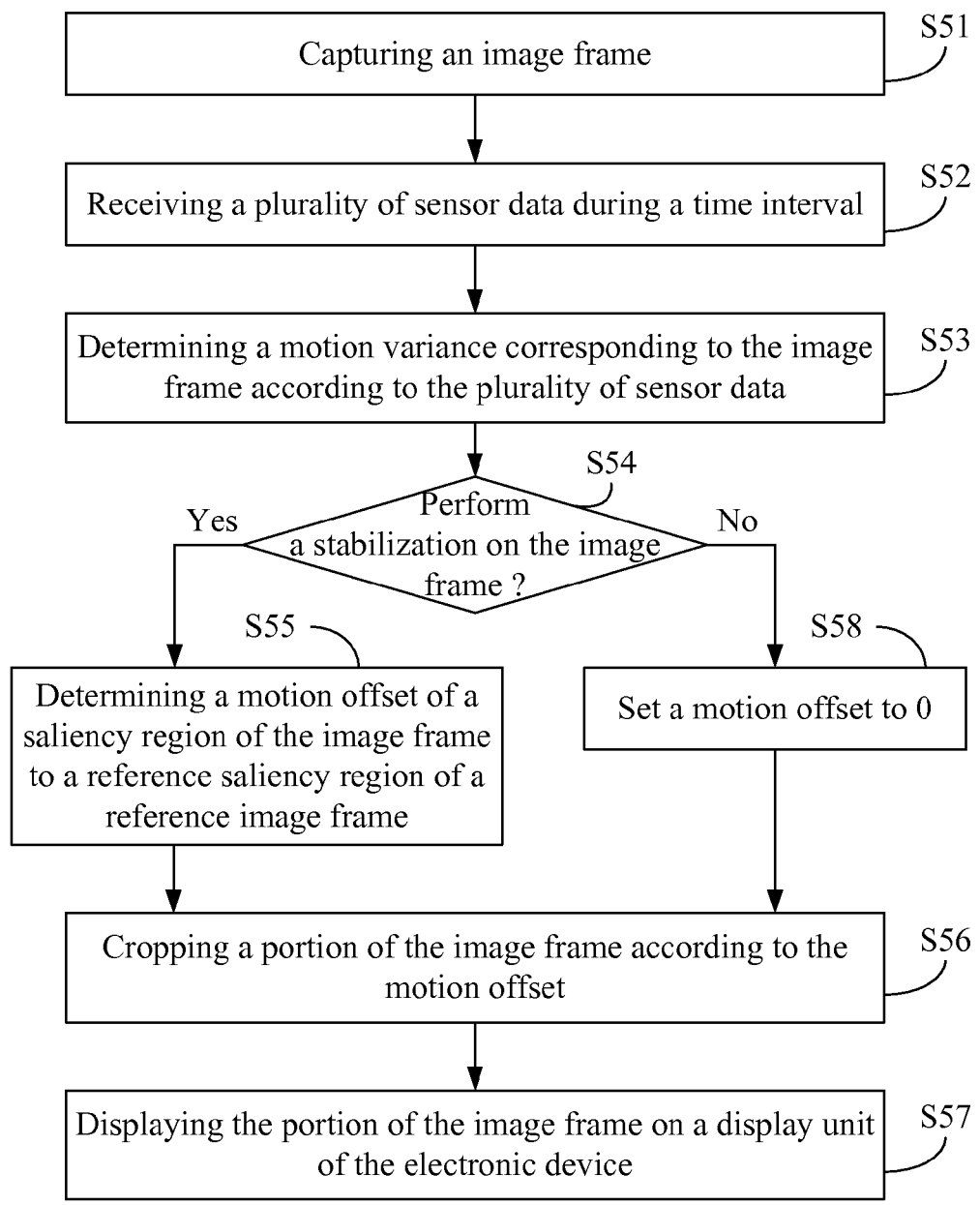
FIGS. 5A-5E illustrates the flowcharts of the fifth embodiment.
Figure 5B:
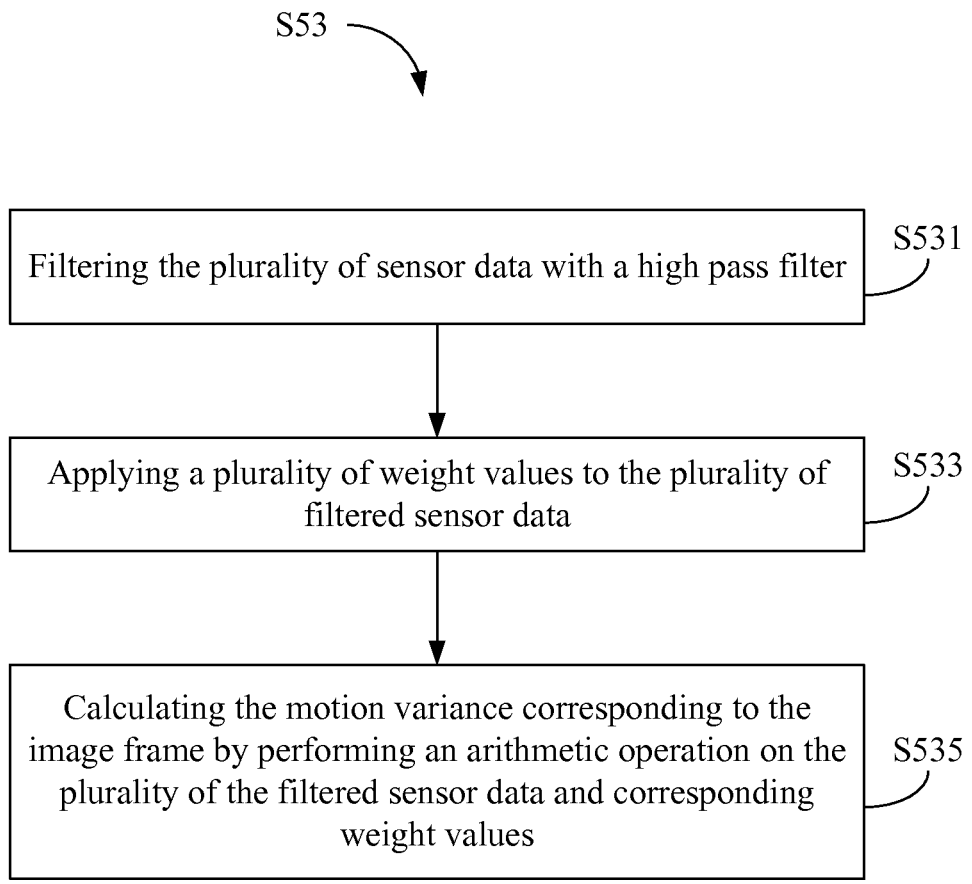
Figure 5C:
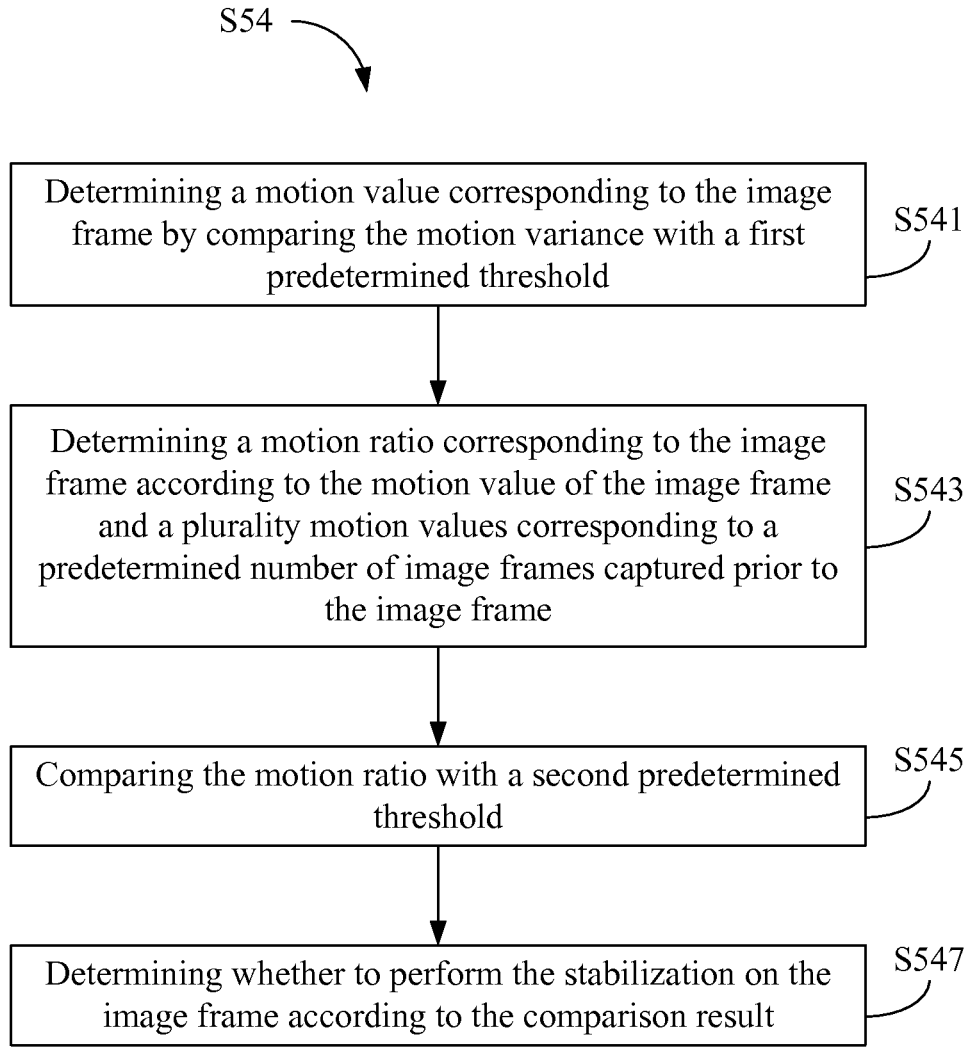

In some embodiments, the step S53 may be realized by the steps S531, S533, and S535 illustrated in FIG. 5B and the step S54 may be realized by the steps S541, S543, S545, and S547 as shown in FIG. 5C.

Particularly, step S531 is executed to filter the plurality of sensor data with a high pass filter by the electronic device. Next, step S533 is executed to apply a plurality of weight values to the plurality of filtered sensor data. Afterwards, step S535 is executed for calculating the motion variance corresponding to the image frame by performing an arithmetic operation on the plurality of the filtered sensor data and corresponding weight values.

In step S541, the electronic device determines a motion value corresponding to the image frame by comparing the motion variance with a first predetermined threshold. Subsequently, step S543 is executed to determine a motion ratio corresponding to the image frame according to the motion value of the image frame and a plurality motion values corresponding to a predetermined number of image frames captured prior to the image frame. It should be aware that the plurality of motion values corresponding to the predetermined number of image frames are accessed from a storage unit. The electronic device then executes step S545 to compare the motion ratio with a second predetermined threshold. Next, step S547 is executed for determining whether to perform the stabilization on the image frame according to the comparison result. For example, when the comparison result of the step S545 indicates that the motion ration is greater than the second predetermined threshold, the step S547 may determine that the stabilization has to be performed. On the contrary, when the comparison result of the step S545 indicates that the motion ration is not greater than the second predetermined threshold, the step S547 may determine that the stabilization is not required.

Figure 5D:
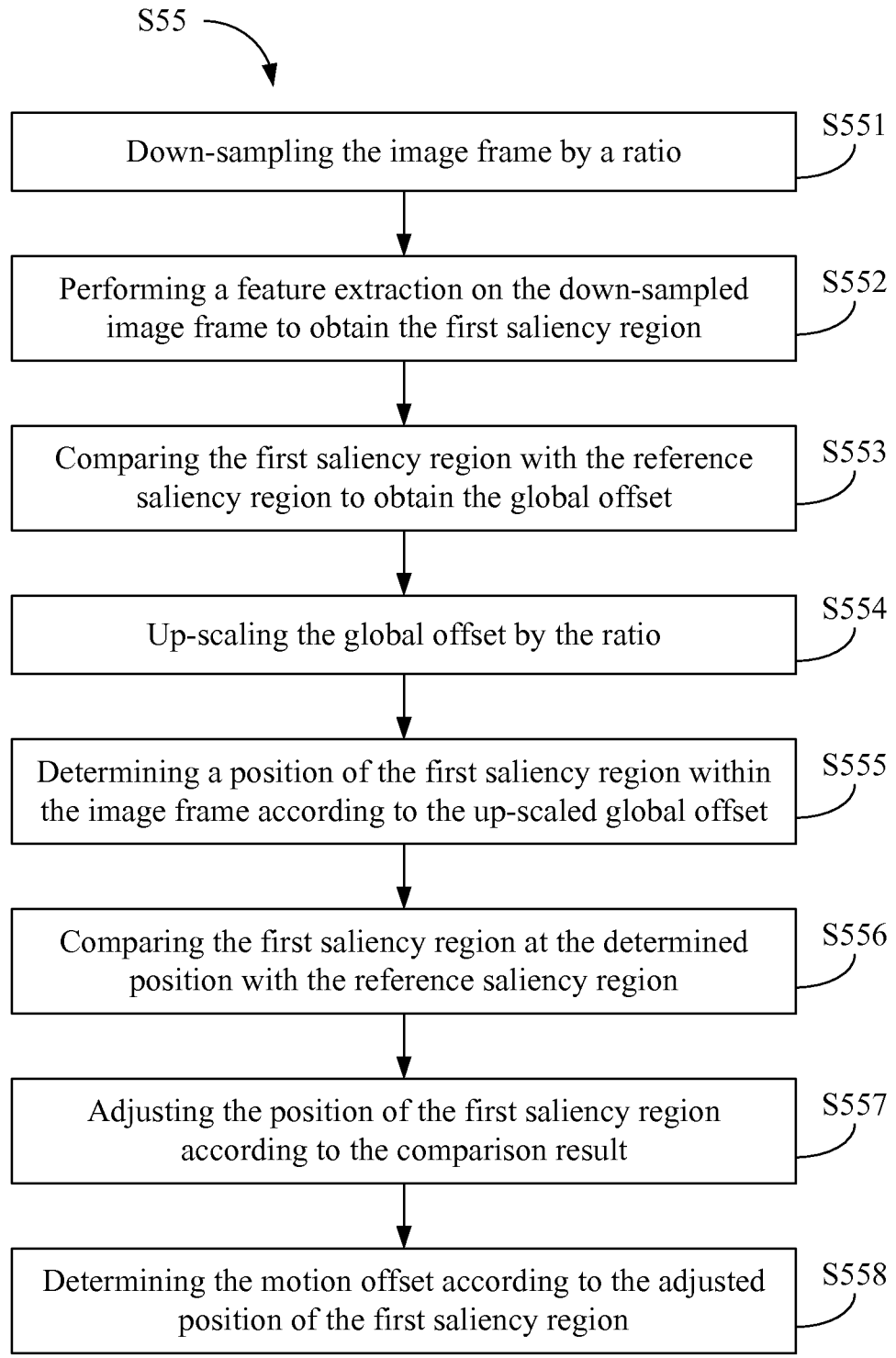

In some embodiments, the step S55 may be realized by the steps S551-S558 illustrated in FIG. 5D. Specifically, steps S551-S553 are executed for determining a global offset in a lower resolution, while steps S554-S558 are executed for determining the motion offset in an original resolution according to the global offset. It is understood that the lower resolution is lower than the original resolution.

In step S551, the electronic device down-samples the image frame by a ratio. Next, step S552 is executed for performing a feature extraction on the down-sampled image frame to obtain the first saliency region. The electronic device than executes step S553 to compare the first saliency region with the reference saliency region to obtain the global offset.

In step S554, the electronic device up-scales the global offset by a ratio, such as the ratio in step S551. Following that, step S555 determines a position of the first saliency region within the image frame according to the up-scaled global offset. Next, step S556 compares the first saliency region at the determined position with the reference saliency region. In step S557, the electronic device adjusts the position of the first saliency region according to the comparison result. Finally, the step S558 is executed by the electronic device to determine the motion offset according to the adjusted position of the first saliency region.

Figure 5E:
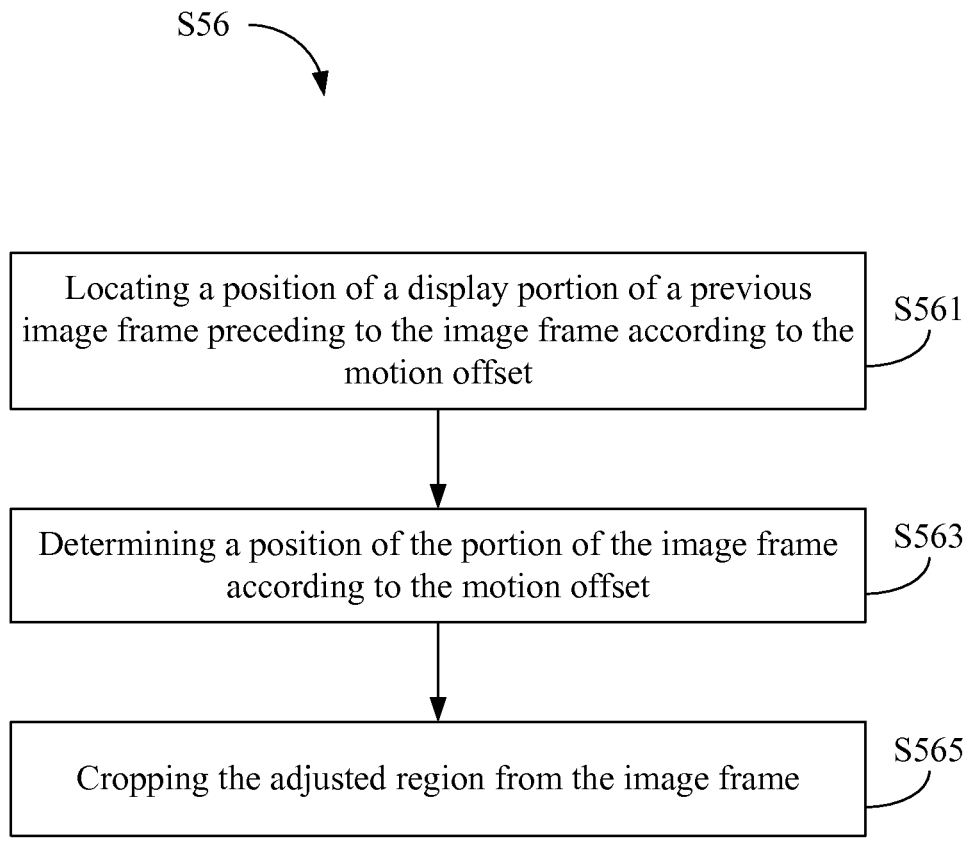

Yet in some embodiments, the step S56 may be realized by the steps S561, S563, and S565 illustrated in FIG. 5E. Specifically, step S561 is executed by the electronic device to locate a position of a display portion of a previous image frame preceding to the image frame according to the motion offset. Next, step S563 is executed for determining a position of the portion of the image frame according to the motion offset. Finally, step S565 is executed by the electronic device for cropping the adjusted region from the image frame.

In addition to the aforesaid steps, the fifth embodiment can execute all the operations and functions set forth for the electronic devices 1-4 in the first to the fourth embodiments. How the fifth embodiment executes these operations and functions will be readily appreciated by those of ordinary skill in the art based on the explanation of the first to the fourth embodiments, and thus will not be further described therein.

Figure 6:
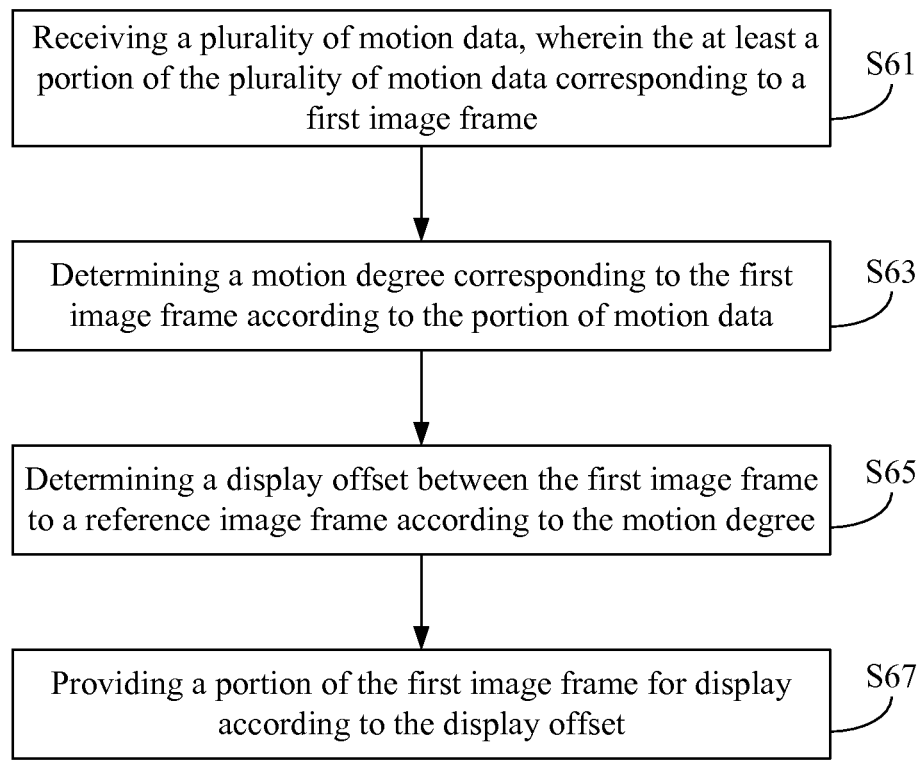
FIG. 6 illustrates the flowchart of the sixth embodiment.

A sixth embodiment of the present invention is a method for image stabilization for use in an electronic device such as the electronic devices 1-4. A flowchart of the method is illustrated in FIG. 6.

First, step 61 is executed by the electronic device for receiving a plurality of motion data, wherein the at least a portion of the plurality of motion data corresponding to a first image frame. Next, step S63 is executed for determining a motion degree corresponding to the first image frame according to the portion of motion data.

In some embodiments, the step S63 can be realized by applying a weight value to each of the portion of the motion data, calculating a motion variance corresponding to the first image frame according to the portion of the motion data and the corresponding weight values, and calculating the motion degree corresponding to the first image frame according to the motion variance corresponding to the first image frames and a plurality of pre-stored motion variance corresponding to a plurality of second image frames displayed prior to the first image frame.

After the step S63, step S65 is executed by the electronic device for determining a display offset between the first image frame to a reference image frame according to the motion degree. In some embodiments, the step S63 can be realized by performing a feature extraction to obtain the first saliency region in the first image frame and determining whether the motion degree corresponding to the first image frame exceeds a predetermined threshold. It is noted that the first saliency region and the reference saliency region comprises substantially identical scene.

When the motion degree exceeds the predetermined threshold, step 63 further executes a step for determining the display offset according to a position offset between a first saliency region of the first image frame and a reference saliency region of the reference image frame. On the contrary, when the motion degree does not exceed the predetermined threshold, step 63 further set the display offset to 0.

After the step S65, step S67 is executed by the electronic device for providing a portion of the first image frame for display according to the display offset. It should be understood that the reference image frame is displayed prior to the first image frame and is stored in a storage unit. In some embodiments, the step S63 can be realized by obtaining a starting position of a display window in the reference image frame, moving the starting position of the display window in the first image frame according to the display offset, and cropping the portion of the first image frame within the display window.

In addition to the aforesaid steps, the fifth embodiment can execute all the operations and functions set forth for the electronic devices 1-4 in the first to the fourth embodiments. How the fifth embodiment executes these operations and functions will be readily appreciated by those of ordinary skill in the art based on the explanation of the first to the fourth embodiments, and thus will not be further described therein.

According to the above embodiments, an electronic device that adopts the present invention will determine motion information (e.g. the aforementioned motion variance, motion value, and/or motion degree) of an image frame according to sensor data that are received within a time interval comprising a time the image frame is captured, determine whether stabilization is required, and determine a display offset for the image frame. Various kinds of motion information are provided by the present invention so that whether the stabilization is required can be determined more accurately and efficiently. In addition, various kinds of techniques for performing motion estimation are provided by the present invention so that the display offset can be determined more accurately and efficiently. Hence, the effect of small disturbances caused due to undesired shaking (e.g. hand shaking) can be minimized The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for image stabilization for use in an electronic device, comprising:
   capturing an image frame;
   receiving a plurality of sensor data during a time interval comprising a time the image frame is captured,
   determining a motion variance corresponding to the image frame according to the plurality of sensor data;
   determining whether to perform a stabilization on the image frame according to the motion variance; and
   in response to the stabilization being determined to be performed:
   determining a motion offset of a first saliency region of the image frame to a reference saliency region of a reference image frame;
   cropping a portion of the image frame according to the motion offset; and
   displaying the portion of the image frame on a display unit of the electronic device;
   wherein the reference image frame is captured prior to the image frame and is stored in a memory unit within the electronic device.

2. The method of claim 1, wherein the step of determining the motion variance comprises:
   filtering the plurality of sensor data with a high pass filter;
   applying a plurality of weight values to the plurality of filtered sensor data;
   calculating the motion variance corresponding to the image frame by performing an arithmetic operation on the plurality of the filtered sensor data and corresponding weight values.

3. The method of claim 2, wherein the step of determining whether to perform the stabilization comprises:
   determining a motion value corresponding to the image frame by comparing the motion variance with a first predetermined threshold;
   determining a motion ratio corresponding to the image frame according to the motion value of the image frame and a plurality motion values corresponding to a predetermined number of image frames captured prior to the image frame, wherein the plurality of motion values corresponding to the predetermined number of image frames are accessed from a storage unit;
   comparing the motion ratio with a second predetermined threshold; and
   determining whether to perform the stabilization on the image frame according to the comparison result.

4. The method of claim 1, wherein the step of determining of the motion offset comprises:
   determining a global offset in a lower resolution; and
   determining the motion offset in an original resolution according to the global offset;
   wherein the lower resolution is lower than the original resolution.

5. The method of claim 4, wherein the step of determining of the global offset comprises:
   down-sampling the image frame by a ratio;
   performing a feature extraction on the down-sampled image frame to obtain the first saliency region; and
   comparing the first saliency region with the reference saliency region to obtain the global offset.

6. The method of claim 4, wherein the step of determining of the motion offset in the original resolution comprises:
   up-scaling the global offset by a ratio;
   determining a position of the first saliency region within the image frame according to the up-scaled global offset;
   comparing the first saliency region at the determined position with the reference saliency region;
   adjusting the position of the first saliency region according to the comparison result; and
   determining the motion offset according to the adjusted position of the first saliency region.

7. The method of claim 1, wherein the step of cropping of the portion of the image frame comprises:
   locating a position of a display portion of a previous image frame preceding to the image frame according to the motion offset;
   determining a position of the portion of the image frame according to the motion offset; and
   cropping the adjusted region from the image frame.

8. An electronic device, comprising:
   an image input unit, configured to capture a first image frame;
   a sensor input unit, configured to receive a plurality of sensor data, the plurality of sensor data is received by the sensor input unit during a time interval comprising a time the first image frame is captured; and
   an image processing unit, configured to process the first image frame and comprising:
   a motion analysis unit, configured to determine a motion variance corresponding to the first image frame according to the plurality of sensor data;
   a motion determination unit, configured to determine whether to perform a stabilization on the first image frame according to the motion variance corresponding to the first image frame; and
   a stabilization unit, configured to determine a display offset of the first image frame with respect to a reference image frame according to the stabilization determination; and
   a display unit, configured to display a portion of the first image frame according to the display offset.

9. The electronic device of claim 8, wherein the motion analysis unit comprises:
   a variance calculation unit, configured to determine the motion variance by performing an arithmetic operation on a portion of the plurality of sensor data and a plurality of weight values; and
   a variance comparison unit, configured to compare the motion variance with a first threshold.

10. The electronic device of claim 9, wherein the motion analysis unit further comprises a high pass filter configured to filter the plurality of sensor data.

11. The electronic device of claim 8, wherein the motion determination unit determination unit further comprises:
- a value determination unit, configured to determine a motion ratio corresponding to the first image frame according to a motion value corresponding to the first image frame and a plurality of motion values corresponding to a plurality of second image frames captured prior to the first image frame; and
- a mode selection unit, configured to compare the motion ratio with a second predetermined threshold and determine whether to perform the stabilization according to the comparison result.

12. The electronic device of claim 11, further comprises a storage unit configured to store the plurality of motion values corresponding to the plurality of second image frames.

13. The electronic device of claim 8, wherein the stabilization unit further comprises:
- a down sample unit, configured to down sample the first image frame by a ratio;
- a feature extraction unit, configured to obtain a first saliency region within the first image frame;
- a motion estimation unit, configured to determine the display offset according to an offset between the first saliency region and a reference saliency region within a reference image frame, wherein the reference image frame is captured prior to the first image frame.

14. The electronic device of claim 13, wherein the motion estimation unit further comprises:
- a coarse motion estimation unit, configured to determine a global offset between the first saliency region and the reference saliency region in a down-sampled resolution; and
- a fine motion estimation unit, configured to determine the display offset between the first saliency region and the reference saliency region in a full resolution according to the global offset wherein the down-sampled resolution is lower than the full resolution.

15. A method for image stabilization for use in an electronic device, comprising:
- receiving a plurality of motion data from a sensor input unit, at least a portion of the plurality of motion data corresponding to a first image frame, the motion data being provided in a constant rate higher than an image frame rate of an image input unit;
- determining a motion degree corresponding to the first image frame according to the portion of motion data;
- determining a display offset between the first image frame to a reference image frame according to the motion degree; and
- providing a portion of the first image frame for display according to the display offset;

wherein the reference image frame is displayed prior to the first image frame and is stored in a storage unit.

16. The method of claim 15, wherein the step of determining of the motion degree comprises :
- applying a weight value to each of the portion of the motion data;
- calculating a motion variance corresponding to the first image frame according to the portion of the motion data and the corresponding weight values;
- calculating the motion degree corresponding to the first image frame according to the motion variance corresponding to the first image frames and a plurality of pre-stored motion variance corresponding to a plurality of second image frames displayed prior to the first image frame.

17. The method of claim 15, wherein the step of determining of the display offset further comprises:
- determining whether the motion degree corresponding to the first image frame exceeds a predetermined threshold;
- in response to the motion degree exceeding the predetermined threshold, determining the display offset according to a position offset between a first saliency region of the first image frame and a reference saliency region of the reference image frame;

wherein the first saliency region and the reference saliency region comprises substantially identical scene.

18. The method of claim 17, wherein the step of determining of the display offset further comprises performing a feature extraction to obtain the first saliency region in the first image frame.

19. The method of claim 17, wherein the display offset is set to 0 in response to the motion degree corresponding to the first image frame not exceeding the predetermined threshold.

20. The method of claim 15, wherein the providing of the portion of the first image frame further comprises:
- obtaining a starting position of a display window in the reference image frame;
- moving the starting position of the display window in the first image frame according to the display offset;
- cropping the portion of the first image frame within the display window.

* * * * *